United States Patent
Leach

(10) Patent No.: US 9,323,904 B2
(45) Date of Patent: *Apr. 26, 2016

(54) BLOG POST PROTECTION PATHWAY

(71) Applicant: James Jackson Leach, Austin, TX (US)

(72) Inventor: James Jackson Leach, Austin, TX (US)

(73) Assignee: COPYRIGHTNOW, LLC, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/049,749

(22) Filed: Oct. 9, 2013

(65) Prior Publication Data

US 2015/0101058 A1    Apr. 9, 2015

(51) Int. Cl.
| | |
|---|---|
| G06F 21/10 | (2013.01) |
| G06Q 50/18 | (2012.01) |
| G06F 21/62 | (2013.01) |
| G06Q 10/10 | (2012.01) |
| H04L 29/06 | (2006.01) |

(52) U.S. Cl.
CPC ............ *G06F 21/10* (2013.01); *G06F 21/6272* (2013.01); *G06Q 10/10* (2013.01); *G06Q 50/184* (2013.01); *H04L 63/10* (2013.01); *G06F 2221/2151* (2013.01); *H04L 2463/101* (2013.01)

(58) Field of Classification Search
CPC ..... G06F 17/3089; G06F 21/10; G06F 21/60; G06F 21/6272; G06F 2221/2151; G06Q 10/10; G06Q 50/184; H04L 63/10; H04L 2463/101
See application file for complete search history.

(56) References Cited

U.S. PATENT DOCUMENTS 5,983,351 A * 11/1999 Glogau ................... 726/26

| | | |
|---|---|---|
| 7,266,767 B2 | 9/2007 | Parker |
| 7,657,759 B2 | 2/2010 | Rubin et al. |
| 7,779,058 B2 | 8/2010 | Shea |
| 8,214,295 B2 | 7/2012 | O'Donnell et al. |
| 8,271,507 B2 | 9/2012 | Farmer |

(Continued)

OTHER PUBLICATIONS

Kroeck, Legal Zoom: "How to Copyright Your Entire Blog," Dec. 20, 2012, retrieved from https://web.archive.org/web/20121220033125/ http://info.legalzoom.com/copyright-entire-blog-22442.html, pp. 1-2.*

(Continued)

*Primary Examiner* — Kaveh Abrishamkar
*Assistant Examiner* — James J Wilcox
(74) *Attorney, Agent, or Firm* — Garlick & Markison; Bruce E. Garlick

(57) ABSTRACT

Disclosed herein is a method and system for providing copyright protection for blog posts prior to publication from within a running blog-publishing software application by automatically assembling and electronically submitting a copyright application for the blog post to the United States Copyright Office through the use of a portable application programming interface, which may be utilized by third-party blog-publishing applications, and then automatically publishing the blog post through the blog-publishing application once submission of the electronic copyright application for the blog post is confirmed. Additionally disclosed is a method and system of registering a blog post in order to memorialize the creation of the blog post from within a running blog-publishing application through the use of a portable application programming interface, which may be utilized by third-party blog-publishing applications, and then automatically publishing the blog post through the blog-publishing application once registration of the blog post is confirmed.

17 Claims, 11 Drawing Sheets

(56) References Cited

U.S. PATENT DOCUMENTS

| | | |
|---|---|---|
| 8,285,121 B2 | 10/2012 | Kulas |
| 8,306,922 B1 | 11/2012 | Kunal et al. |
| 8,311,950 B1 | 11/2012 | Kunal et al. |
| 8,321,278 B2 | 11/2012 | Haveliwala et al. |
| 8,341,195 B1 | 12/2012 | Cole et al. |
| 8,346,620 B2 | 1/2013 | King et al. |
| 8,364,688 B1* | 1/2013 | Thomas ............... 707/758 |
| 8,381,310 B2 | 2/2013 | Gangotri et al. |
| 2002/0156737 A1* | 10/2002 | Kahn ............... G06F 21/10 705/51 |
| 2003/0028889 A1* | 2/2003 | McCoskey ......... H04N 7/17318 725/91 |
| 2005/0216288 A1 | 9/2005 | Parsons |
| 2005/0216289 A1* | 9/2005 | Parsons ............... G06Q 10/06 709/223 |
| 2005/0216290 A1* | 9/2005 | Sachs et al. ............... 705/1 |
| 2006/0005030 A1 | 1/2006 | Kassan |
| 2006/0015904 A1 | 1/2006 | Marcus |
| 2006/0101035 A1 | 5/2006 | Mustakallio et al. |
| 2006/0176516 A1* | 8/2006 | Rothschild ......... G06F 17/30265 358/1.15 |
| 2008/0004120 A1 | 1/2008 | Van Luchene et al. |
| 2008/0046222 A1 | 2/2008 | Van Luchene |
| 2008/0235213 A1 | 9/2008 | Gura |
| 2009/0063574 A1* | 3/2009 | Kim ............... G06F 21/10 |
| 2009/0210558 A1 | 8/2009 | Bocook et al. |
| 2010/0023355 A1 | 1/2010 | Sagalow et al. |
| 2010/0154034 A1* | 6/2010 | Tsukada ............... G06F 17/3089 726/4 |
| 2012/0282905 A1 | 11/2012 | Owen |
| 2012/0282911 A1 | 11/2012 | Davis et al. |
| 2012/0284122 A1 | 11/2012 | Brandis |
| 2012/0303659 A1 | 11/2012 | Erhart et al. |
| 2013/0040556 A1 | 2/2013 | Robinson |
| 2014/0181129 A1* | 6/2014 | Thomas ............ G06F 17/30861 707/758 |
| 2014/0214700 A1* | 7/2014 | Leach .................. G06Q 50/184 705/310 |

OTHER PUBLICATIONS

Wordpress Codex "HTTP API," Jun. 26, 2011, pp. 1-3.*
United States Copyright Office, "Welcome to the eCO (electronic Copyright Office) Tutorial: A Guide for Completing your Electronic Copyright Registration," Dec. 2, 2010, pp. 1-45.*
Wordpress, "Schedule a Post, Supporting Everyting Wordpress," Jan. 20, 2013, pp. 1-2.*
Clemson Computing and Information Technology, "Recommended Third Party Solutions," Aug. 23, 2010, pp. 1-2.*
Jorns, "Blogger.com User Guide," Feb. 2009, pp. 1-16, retrieved from https://web.archive.org/web/20090612165449/http://flip4u.org/docs/Blogger%20User%20Guide.pdf.*
American Society of Media Photographers, https://web.archive.org/web/20120607000319/http://asmp.org/tutorials/online-registration-eco.html, Wayback Machine Jun. 7, 2012.*
Mozilla Support, https://support.mozilla.org/en-US/questions/907177, Dec. 25, 2011-Dec. 26, 2011.*

* cited by examiner

BLOG POST PROTECTION PATHWAY

CROSS-REFERENCE TO RELATED APPLICATIONS

The present application is related to U.S. patent application Ser. No. 13/755,872 filed on Jan. 31, 2013, and entitled "CopyRightNow Application Programming Interface".

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention is in the technical field of application programming interfaces. More particularly, the preferred embodiments of the present invention relate generally to a method and system for protecting intellectual property. More particularly, the preferred embodiments of the present invention relate generally to an improved method and system for providing copyright protection for blog posts from within a blog-publishing application before publication of the blog post and for automatically publishing the blog post once copyright protection is confirmed. Additionally, the present invention relates generally to an improved method and system of registering a blog post before publication from within a blog-publishing application in order to memorialize facts of its creation and in order to allow the blog post to be shared and then automatically publishing the blog post once registration is confirmed.

2. Description of the Related Art

The broad concept of using electronic systems to assist in the copyright protection of digital creative works is known. These inventions usually involve using digital means to mark a creative work or encrypt the protected work so that it is accessible only through proper authorization. However, these inventions do not allow for copyright protection to be obtained before publishing a blog post and for a blog post to be automatically published once copyright protection is confirmed.

It is also known to use methods of digital watermarking to identify copyrighted works. Digital watermarking can include inserting watermarks that may be easily viewed by any party accessing a digital creative work or using watermarks that are embedded in the creative work and only identifiable by the party who added the watermark.

It is also known to use electronic systems to encrypt protected works to impede copying. Various methods exist for digitally encrypting the content of a creative work such that decryption is required to access the creative work.

It is also known to use electronic systems to manage creative works by recording them in an online database. Usually these inventions use electronic methods for licensing, sharing and enforcing the proper use of copyrighted material.

It is also known to electronically generate copyright applications for a creative work; however, these inventions do not allow for the generation of copyright applications from within a running third party software application; the electronic submission of the generated copyright application to the United States Copyright Office, along with the requisite fees, before publishing the creative work; or automatic publication of the protected creative work once submission of the generated copyright application is confirmed.

It is also known to use electronic methods to locate an intellectual property attorney and to provide virtual legal services over a computer network.

It is known to electronically protect virtual intellectual property in the context of a video game environment. However, these inventions only allow for submission of the creative work to a virtual video game patent office or a virtual video game copyright office and limits intellectual property protection to the context of a video game environment.

General definitions for terms utilized in the pertinent art are set forth below.

Web browser is a complex software program, resident in a host device, that is capable of loading and displaying text and images and exhibiting behaviors as encoded in HTML (HyperText Markup Language) from the Internet, and also from the client computer's memory. Major browsers include MICROSOFT INTERNET EXPLORER, CHROME, NETSCAPE, APPLE SAFARI, MOZILLA FIREFOX, and OPERA.

Web Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

Application is a software program for a host device, usually for performing a specific function or a range of specific functions.

Blog, short for weblog, is a personal website or web page on which an individual or a group of individuals record opinions, experiences, observations, links to other sites, etc. on a regular basis and often having images or other media.

Blog post is an article posted on a blog.

Blog-publishing Application is an application software program running on a host device, which is used to create blog posts and publish them within a user's blog. Major blog-publishing applications include WORDPRESS, BLOGGER, WEEBLY and TUMBLR.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

SUMMARY OF THE INVENTION

Blog-publishing applications allow for users to quickly publish content in the form of a blog post; however, in some instances it may be desirable to obtain copyright protection on the blog post before publishing the blog post while still maintaining the rapidity of the blog publishing process by automatically publishing the blog post once copyright protection is confirmed. The broad embodiments of the present invention relates generally to an improved method and system for providing copyright protection for blog posts from within a running blog-publishing application by automatically assembling and electronically submitting a copyright application for the blog post to the United States Copyright Office before publishing the blog post and then automatically publishing the blog post once submission of the copyright application is confirmed. More particularly, the preferred embodiments of the present invention relate generally to a method and system for providing copyright protection for blog posts from within a running blog-publishing application through the use of a portable application programming interface, which may be utilized by third-party blog-publishing applications, by automatically assembling and electronically submitting a copyright application for the blog post to the United States Copyright Office through the use of a application programming interface before publishing the blog post and then using the application programming interface to automatically publish the blog post once submission of the copyright application is confirmed. Additionally, the present invention relates generally to an improved method and system of using of a portable application programming interface to register a blog post from within a running blog-publishing application before publishing the blog post and then using the application programming interface to automatically publish the blog post through the blog-publishing application once registration of the blog post is confirmed.

In the most preferred embodiments, the present invention relates to an improved method and system for providing copyright protection for a blog post from within a third party blog-publishing application before publishing the blog post and then automatically publishing the blog post through the blog-publishing application once protection of the blog post is confirmed. A blog-publishing application is any software application which allows for the creation and publication of a blog post, such as a photo blog post, an image blog post, a text blog post, a music blog post, a video blog post, or the like. The present invention allows third party blog-publishing applications to provide copywriting ability and recording capability by incorporating the CopyRightNow Blog Post Protection Pathway API into the third party blog-publishing applications. After a user has created a blog post within a blog-publishing application but before the blog post is published, the user may select an option to obtain copyright protection for the blog post prior to publication from within the blog-publishing application and without exiting the blog-publishing application. When the copyright protection option is selected, the user may choose to register the unpublished blog post with the CopyRightNow system or pursue copyright registration with the United States Copyright Office. CopyRightNow registration allow for the unpublished blog post to be recorded with the CopyRightNow system along with information relevant to memorializing the creation of the blog post, such as date and time of creation, the name of the author, type of blog post, description of the blog post, etc. Information relevant to CopyRightNow registration may be manually entered at the time of recording or obtained from a CopyRightNow user account linked to the CopyRightNow Blog Post Protection Pathway API, or constructed through combining manually entered information and information obtained from a CopyRightNow user account. Once the CopyRightNow Blog Post Protection Pathway API receives electronic confirmation of the registration of the blog post with the CopyRightNow system, the CopyRightNow Blog Post Protection Pathway API automatically publishes the protected blog post through the blog-publishing application. If the user chooses to pursue copyright registration with the United States Copyright Office before publishing the blog post, the CopyRightNow Blog Post Protection Pathway API allows the user to automatically assemble and file an electronic copyright application with the United States Copyright Office and pay the associated application fees from within the blog-publishing application. Information relevant to the United States copyright application may be manually entered at the time that a copyright application is requested or obtained from a CopyRightNow user account linked to the CopyRightNow Blog Post Protection Pathway API that contains the user's information, or assembled by combining manually entered information and information obtained from a CopyRightNow user account. Once the CopyRightNow Blog Post Protection Pathway API receives electronic confirmation of the submission of the electronic copyright application from the United States Copyright Office, the CopyRightNow Blog Post Protection Pathway API automatically publishes the protected blog post through the blog-publishing application. The information pertinent to the copyright application may also be recorded in the CopyRightNow system. The CopyRightNow Blog Post Protection Pathway API may also have the ability to submit the copyright application to a law firm for review before submission to the United States Copyright Office and before publicizing the blog post. The CopyRightNow Blog Post Protection Pathway API provides a portable interface for obtaining copyright protection for a blog post from within a blog-publishing application before the blog post is published and then automatically publishing the blog post through the blog-publishing application once protection of the blog post is confirmed.

BRIEF DESCRIPTION OF THE DRAWING

Illustrative and preferred embodiments of the present invention are shown in the accompanying drawings in which.

DETAILED DESCRIPTION OF THE PREFERRED EMBODIMENTS

For the purpose of illustration, the present invention is shown in the preferred embodiment of an improved system and method for providing copyright protection for a blog post from within a blog-publishing application before the blog post is published and then automatically publishing the blog post once copyright protection is confirmed. Copyright protection is provided by electronically preparing and submitting an electronic copyright application to the United Stated Copyright Office, along with the appropriate fees, and/or by registering the blog post with an online-accessible database which memorializes the creation of the blog post before the blog post is published. These embodiments are not intended to limit the scope of the present invention.

Figure 1:
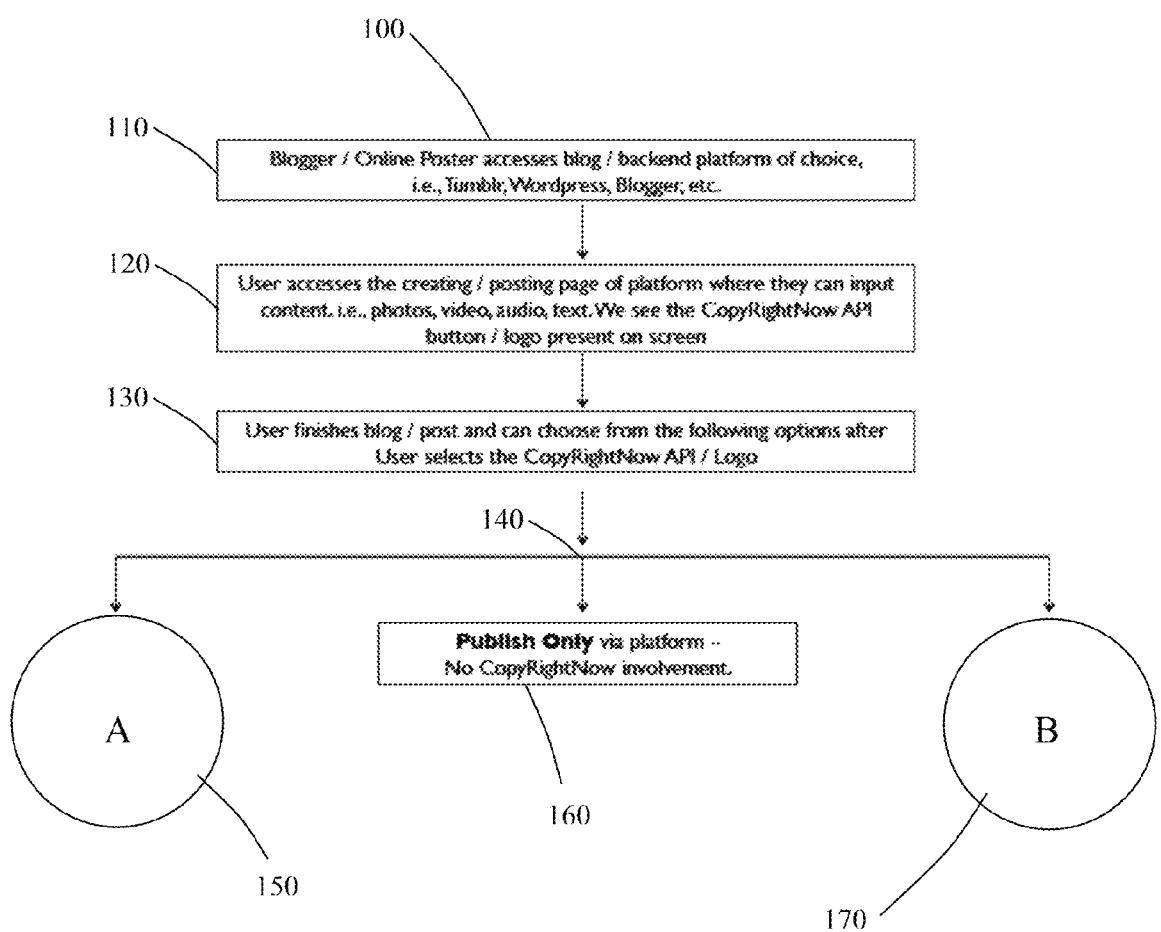
FIG. 1 is a flowchart of the process flow of the present invention.
Figure 2:
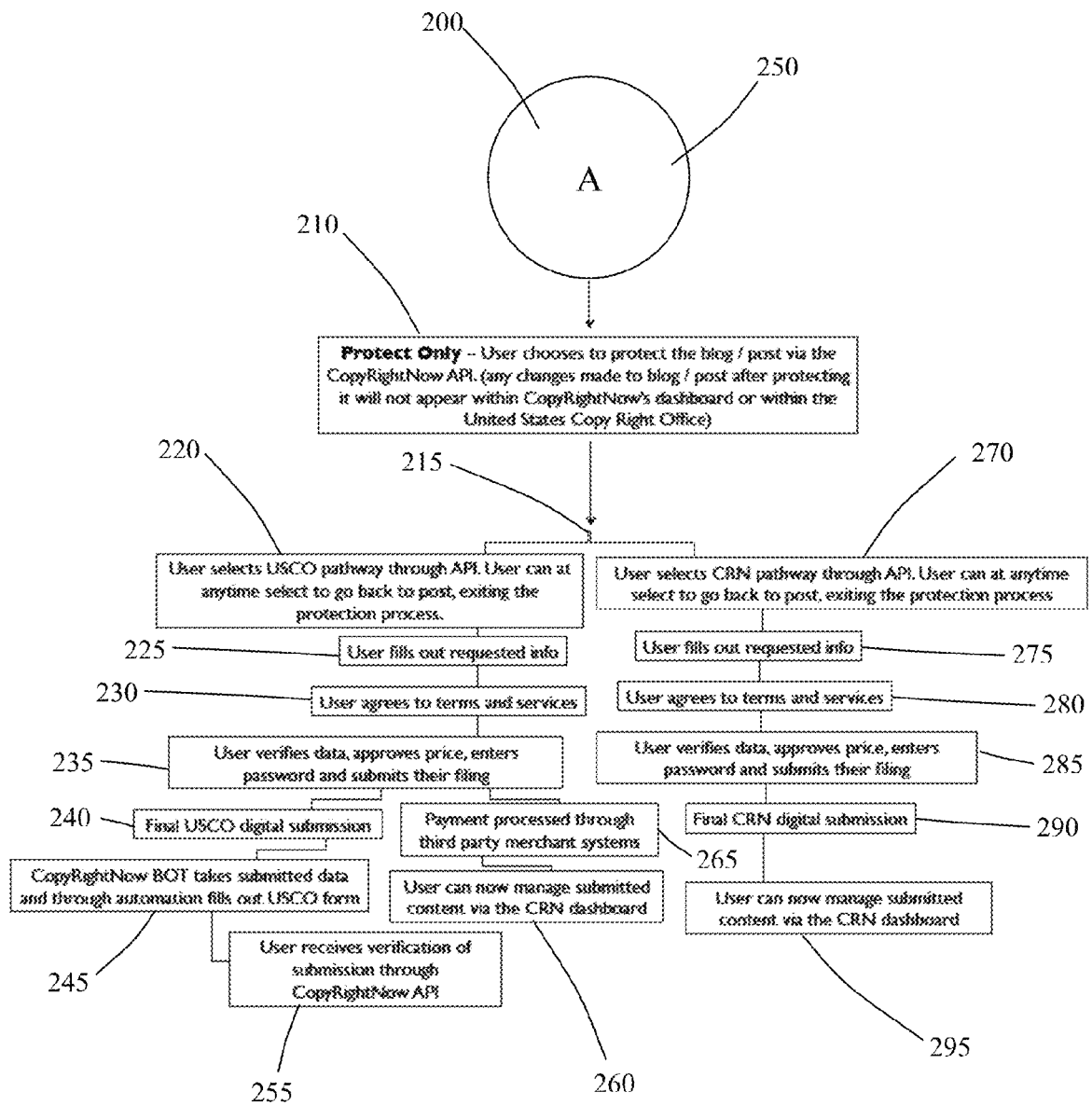
FIG. 2 is a flowchart of the process flow of the present invention continued from FIG. 1.
Figure 3:
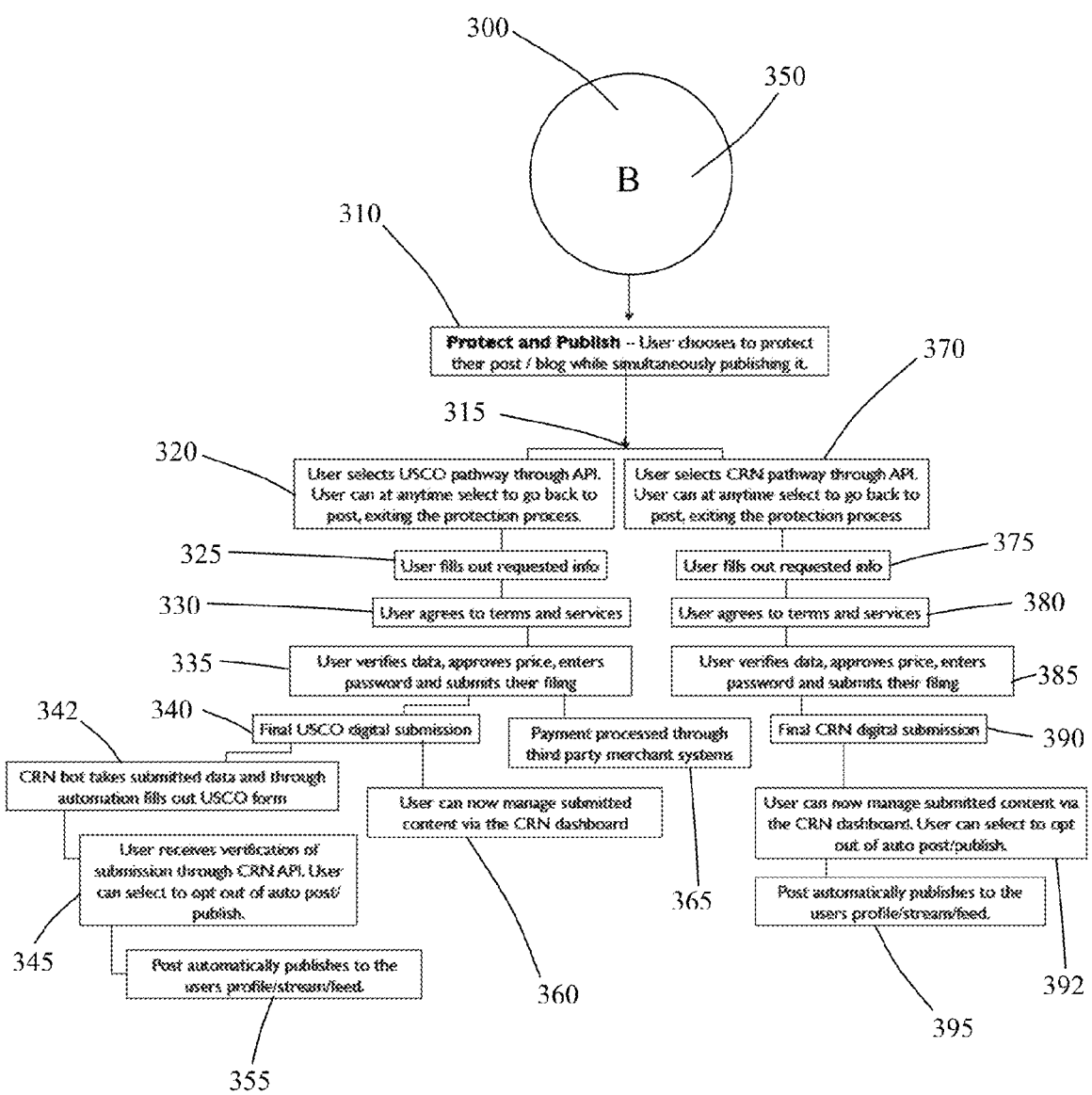
FIG. 3 is a flowchart of the process flow of the present invention continued from FIG. 1.
Figure 4:
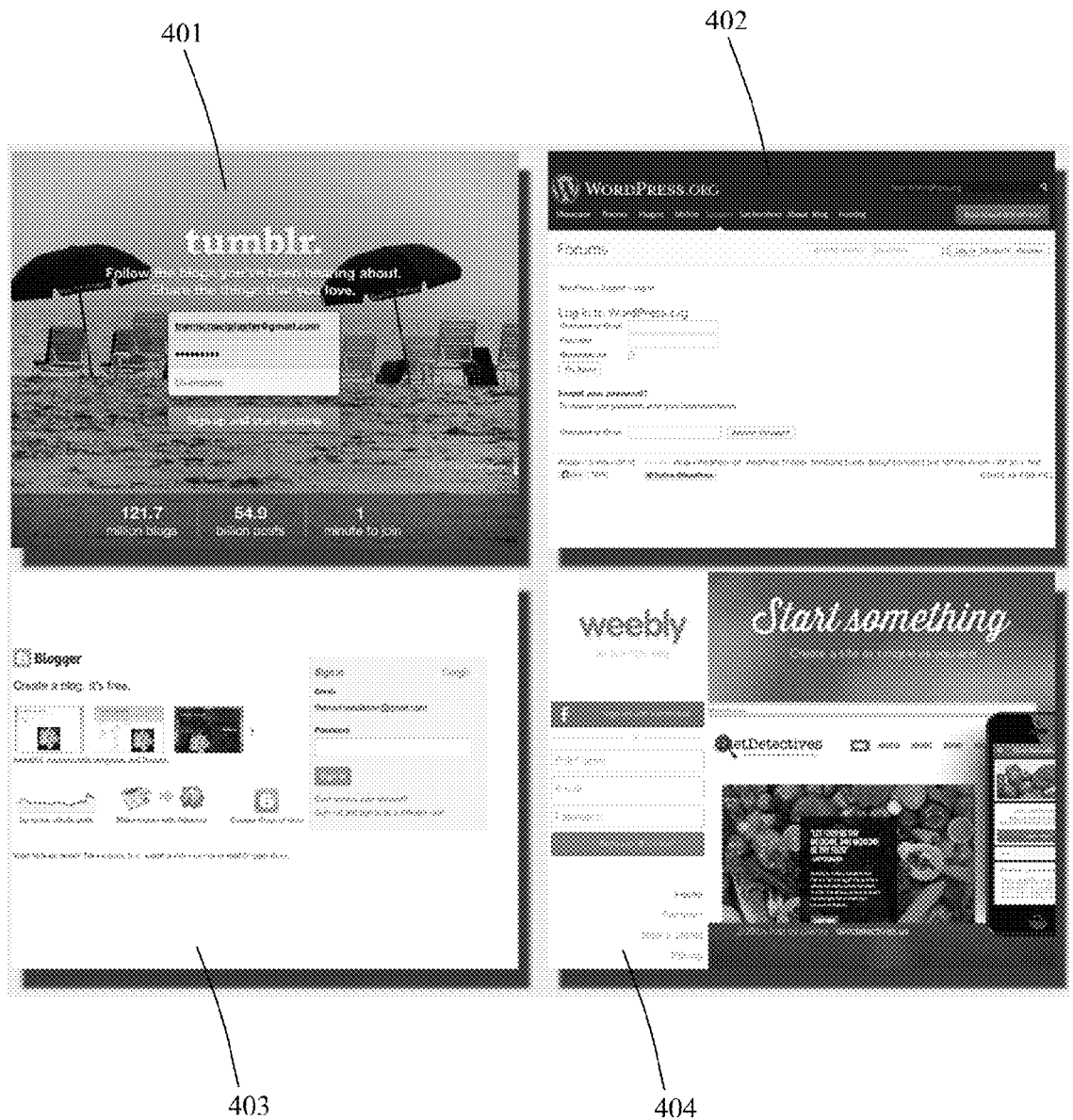
FIG. 4 displays screen views of a blog-publishing applications.
Figure 5:
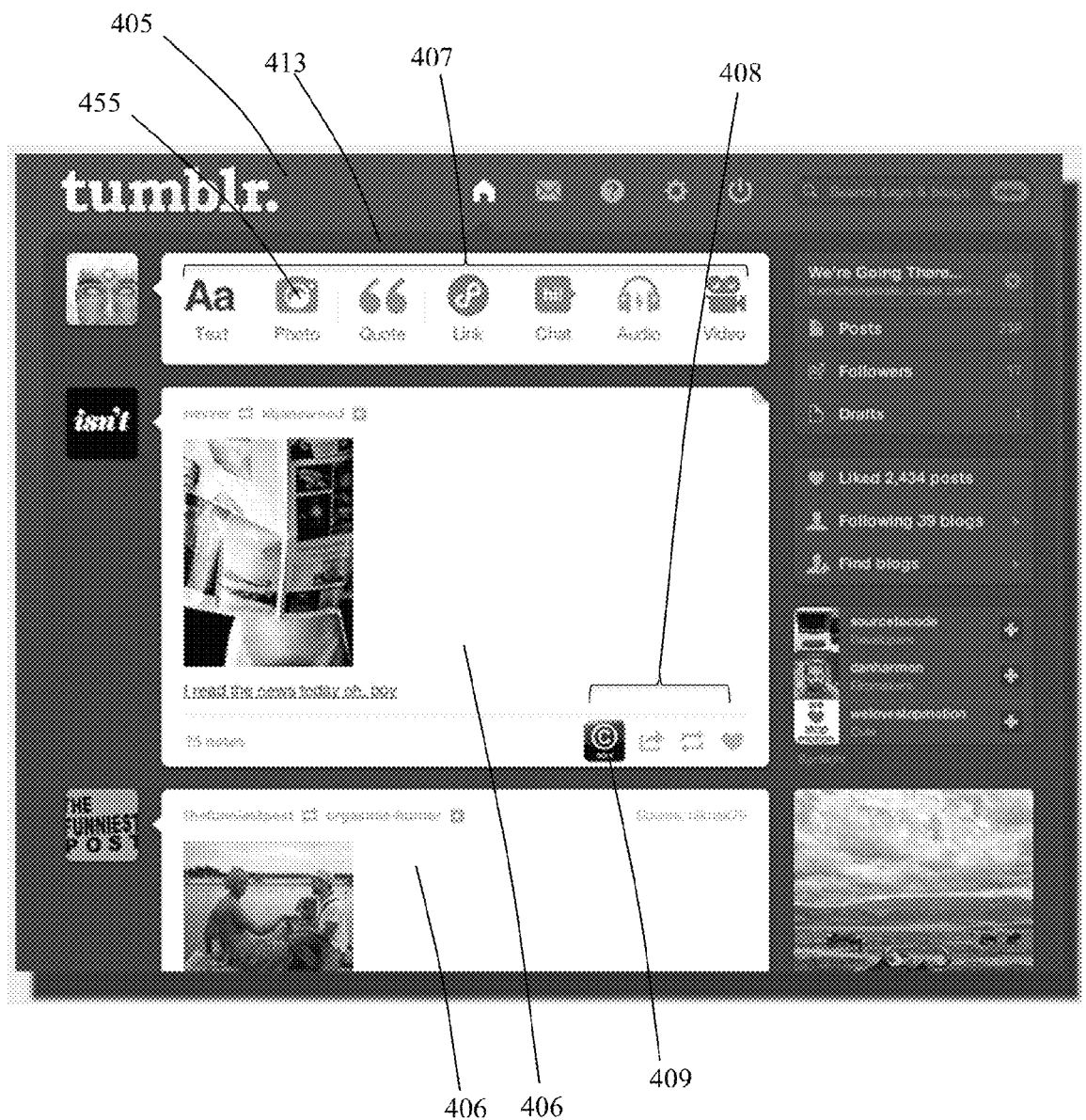
FIG. 5 is a screen view of a blog-publishing application, integrated with the CopyRightNow system.
Figure 6:
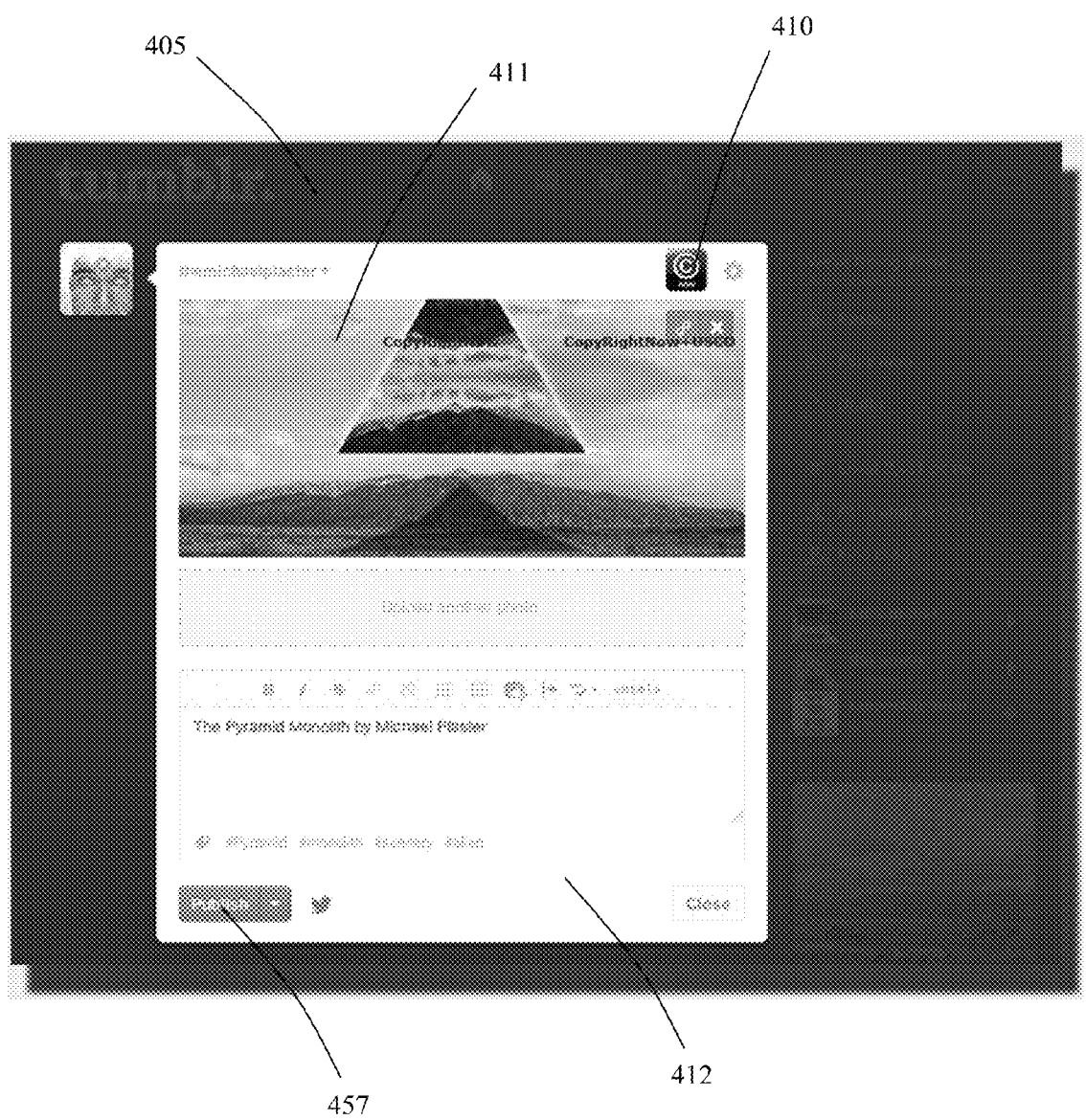
FIG. 6 is a screen view of a blog-publishing application, which displays a blog post in the process of being created.
Figure 7:
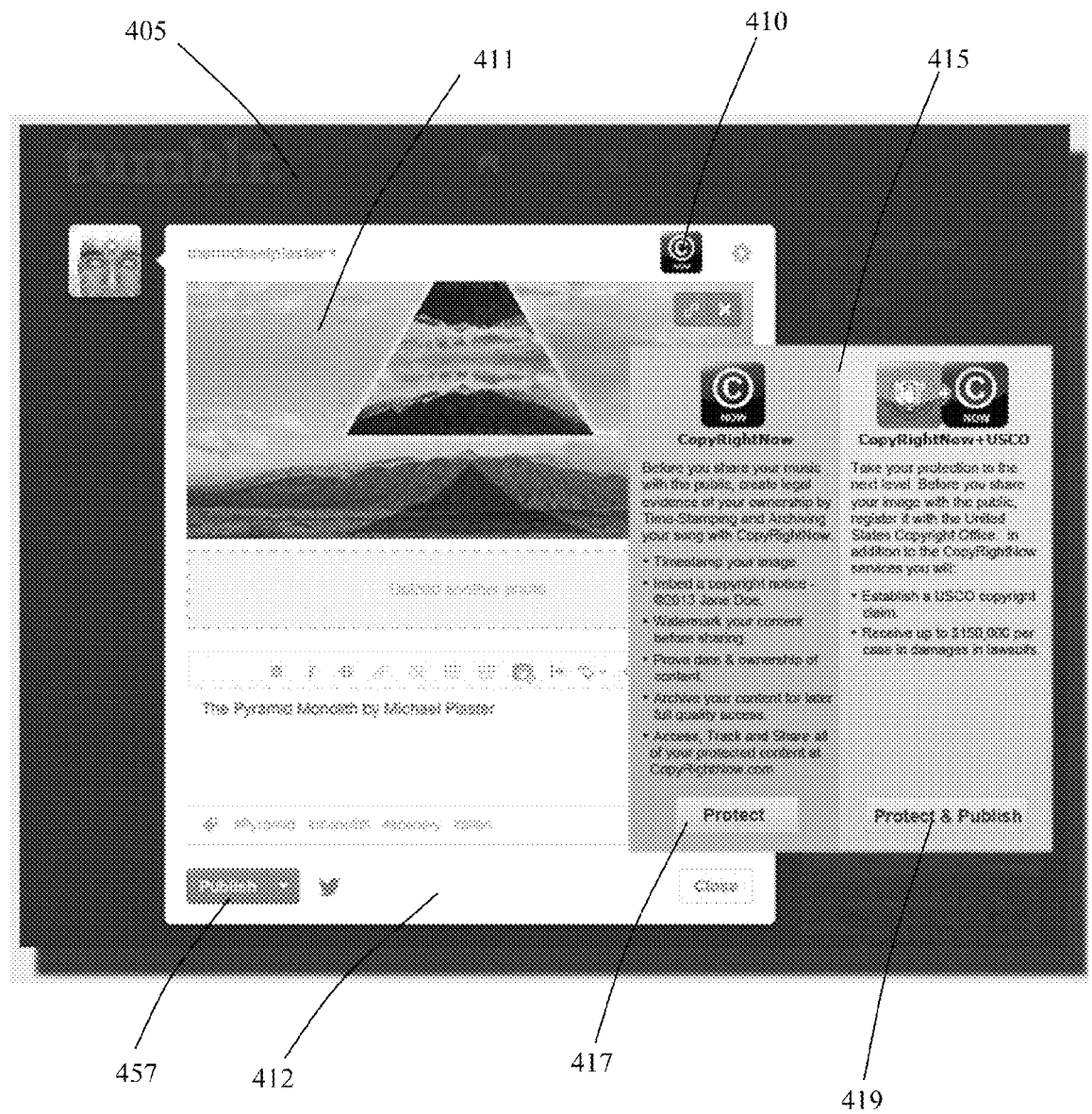
FIG. 7 is a screen view of a CopyRightNow window displayed within a blog-publishing application.
Figure 8:
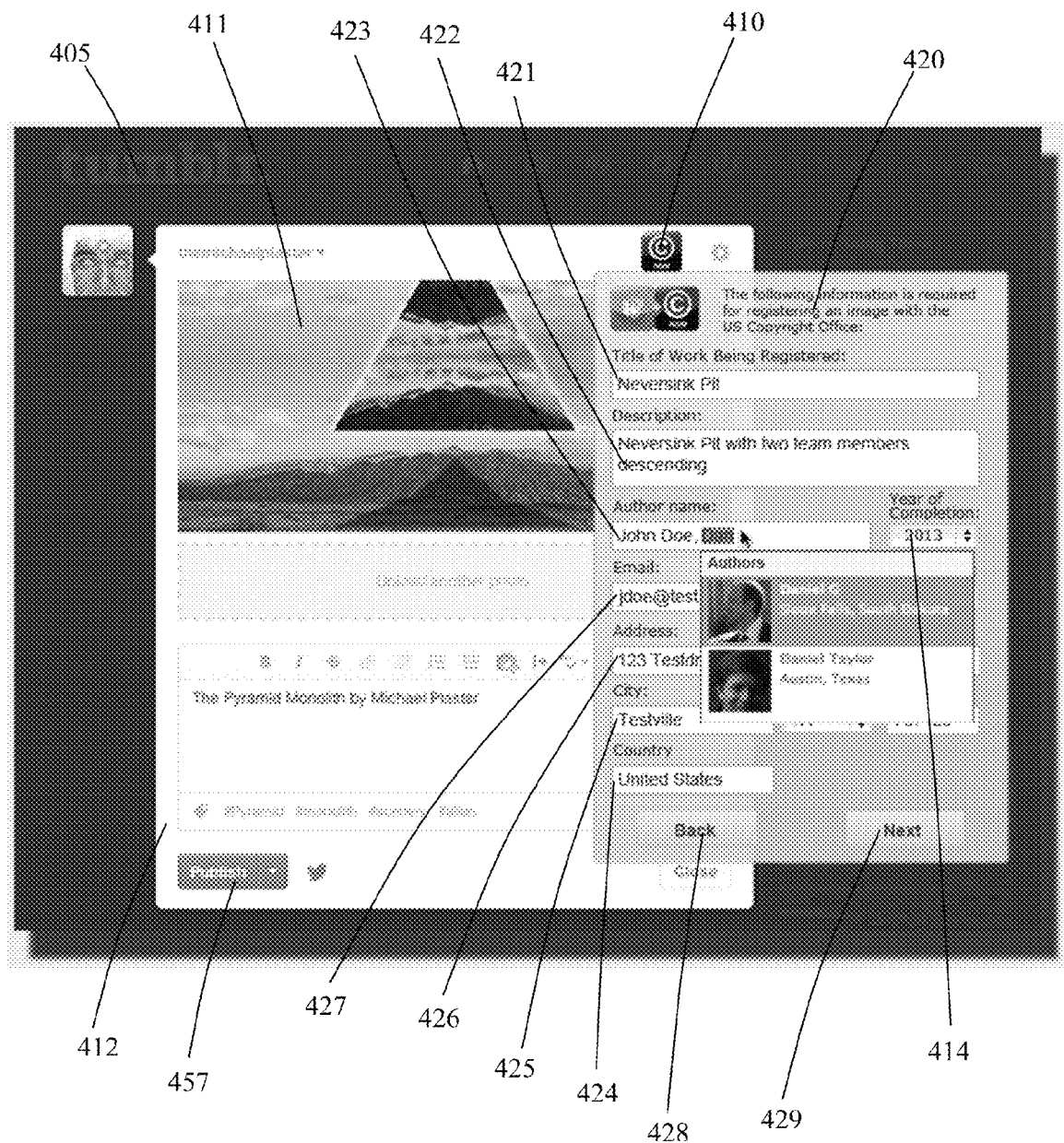
FIG. 8 is a screen view of a CopyRightNow window displayed within a blog-publishing application.
Figure 9:
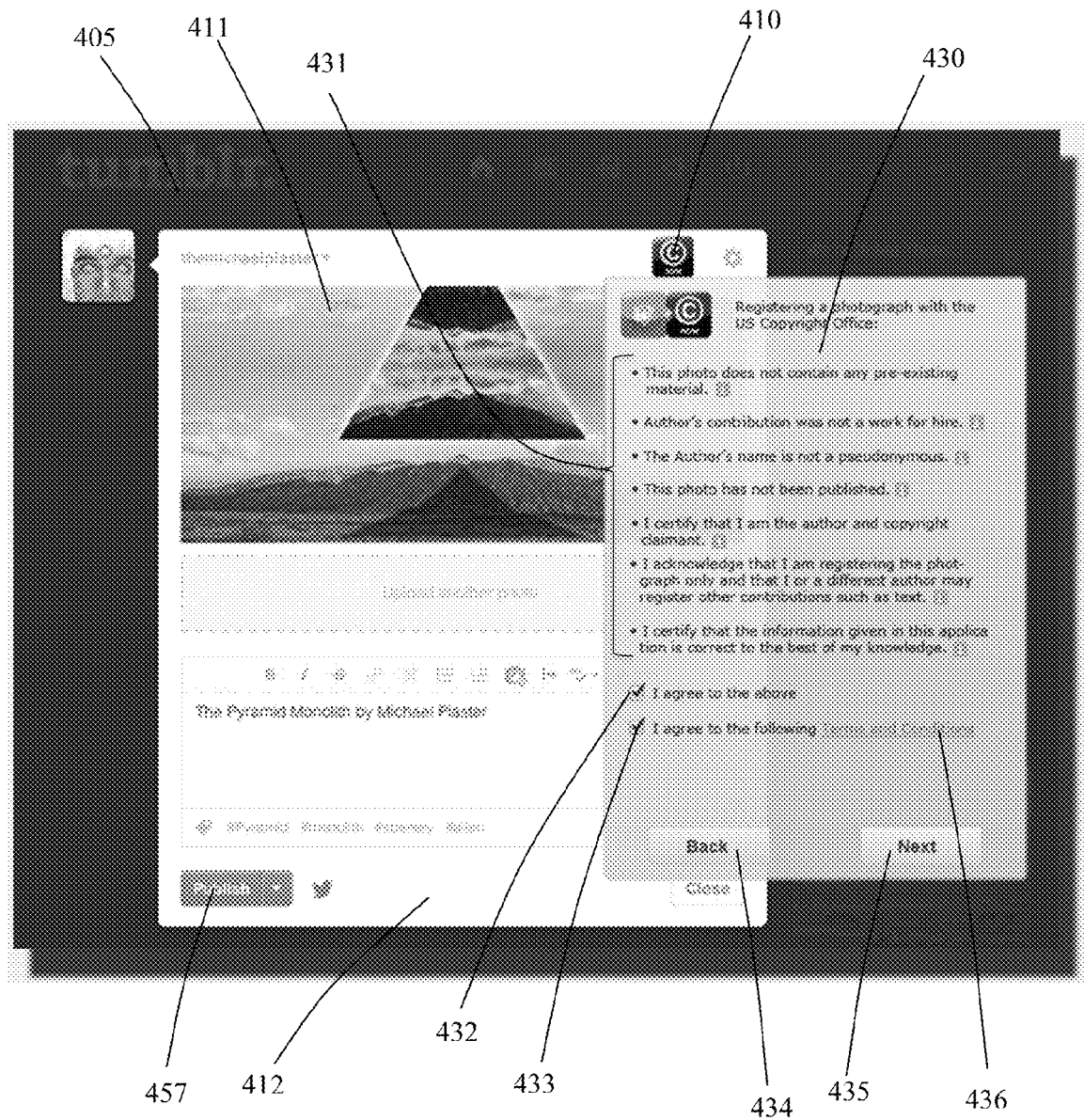
FIG. 9 is a screen view of a CopyRightNow window displayed within a blog-publishing application.
Figure 10:
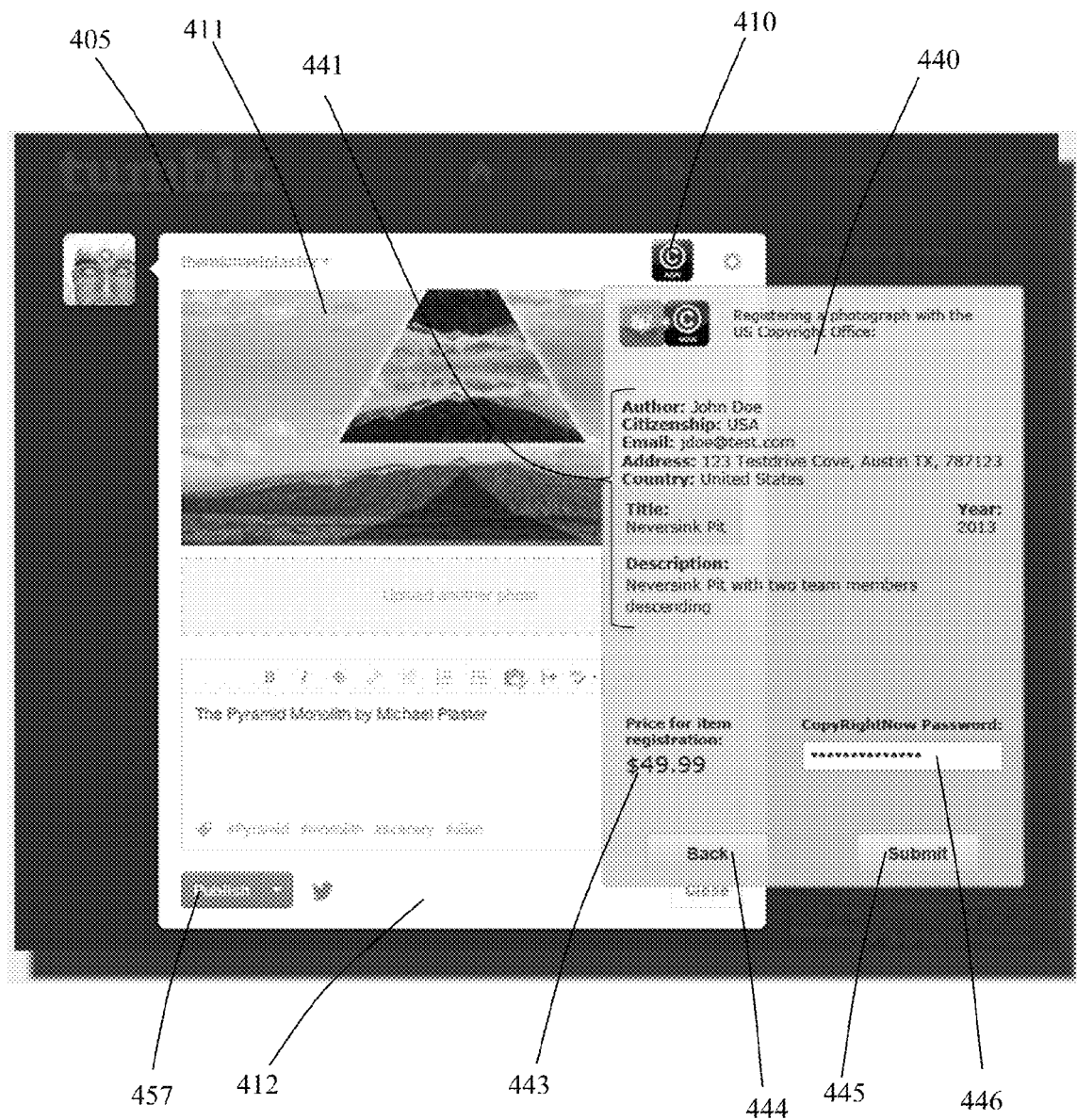
FIG. 10 is a screen view of a CopyRightNow window displayed within a blog-publishing application.
Figure 11:
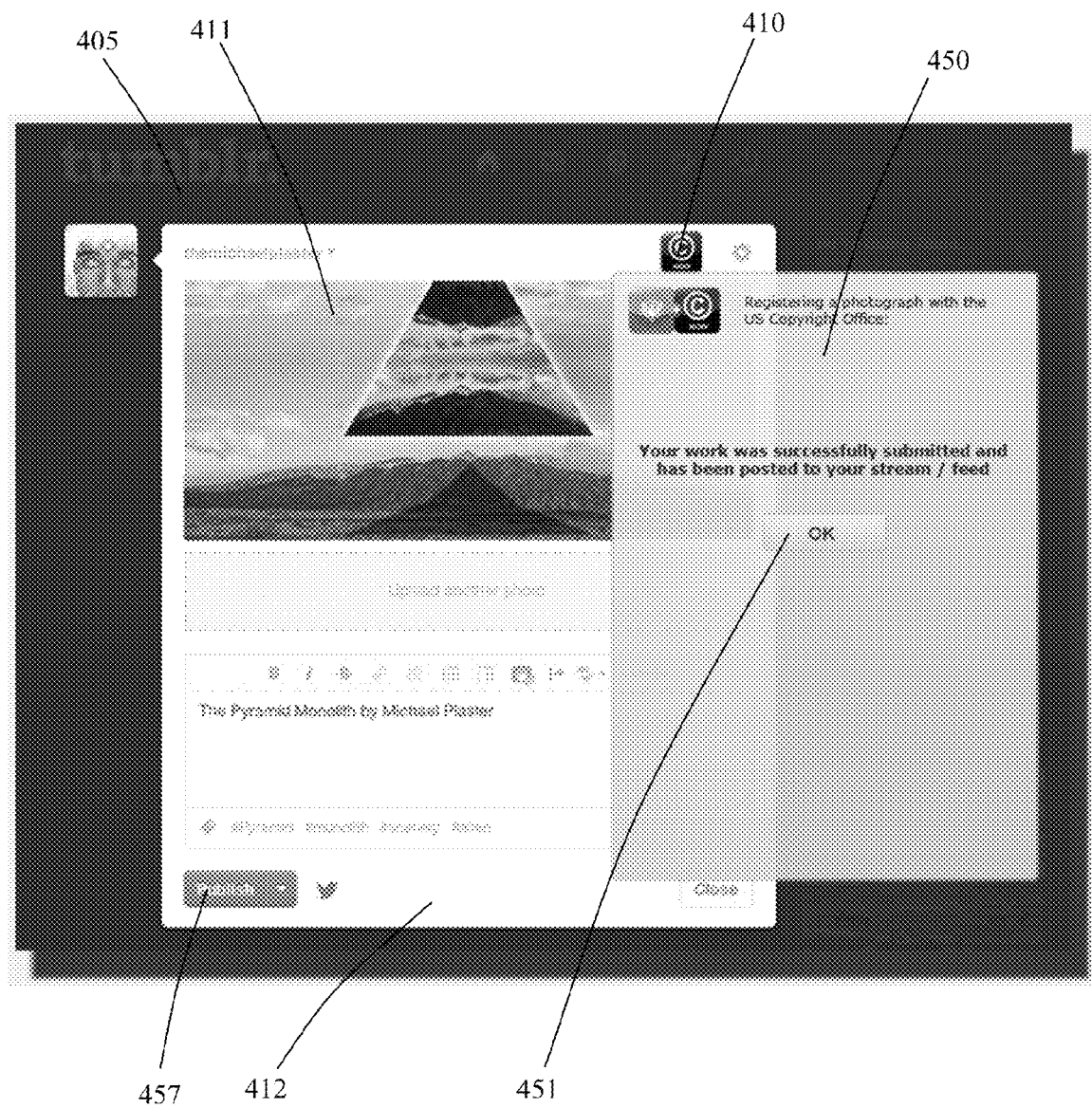
FIG. 11 is a screen view of a CopyRightNow window displayed within a blog-publishing application.

Referring now to the most preferred embodiment of the invention, in FIG. 1, FIG. 2, FIG. 3, FIG. 4, FIG. 5, FIG. 6, FIG. 7, FIG. 8, FIG. 9, FIG. 10 and FIG. 11, the process flow and examples of screen views of the Blog Post Protection Pathway invention are illustrated. FIG. 1 shows an initial flowchart 100 demonstrating the process flow of the system and method provided by the present invention. FIG. 2 illustrates the A-branch continuation 200 of the initial flowchart 100 of FIG. 1 and describes the process flow for protecting a blog post using the CopyRightNow Blog Post Protection Pathway API without publishing the blog post. FIG. 3 depicts the B-branch continuation 300 of the initial flowchart 100 of FIG. 1 and describes the process flow for protecting and publishing a blog post using the CopyRightNow Blog Post Protection Pathway API. FIG. 4 shows screen views of various examples of blog-publishing applications. FIG. 5 displays a screen view of a home screen 413 of a blog-publishing application 405, which is Tumblr, showing a CopyRightNow blog post button 409. FIG. 6 demonstrates a screen view of a blog post creation window 412 of a blog-publishing application 405 showing a CopyRightNow blog path selection button 410. FIG. 7 shows a screen view of a blog post creation window 412 of a blog-publishing application 405 showing a CopyRightNow blog path selection window 415. FIG. 8 displays a screen view of a blog post creation window 412 of a blog-publishing application 405 showing a CopyRightNow protect-and-publish blog registration information window 420. FIG. 9 illustrates a screen view of a blog post creation window 412 of a blog-publishing application 405 showing a CopyRightNow terms and service agreement window 430. FIG. 10 shows a screen view of a blog post creation window 412 of a blog-publishing application 405 showing a CopyRightNow blog post registration payment window 440. FIG. 11 depicts a screen view of a blog post creation window 412 of a blog-publishing application 405 showing a CopyRightNow blog post submission confirmation window 450.

In further detail, referring now to the invention of FIG. 1, an initial flowchart 100 demonstrating the initial process flow of the system and method provided by the present invention is shown. The process of the present invention begins with the first step 110 when a user accesses a blog-publishing application, or platform, such as Tumblr, Wordpress, Blogger, or the like. A blog-publishing application is any software application that allows a user to create and publish a blog post. In the second step 120, within the blog-publishing application, the user accesses a blog post creation page in which content, such as photos, videos, audio, text, or the like, may be combined into an unpublished blog post. After the user completes the unpublished blog post, in the third step 130 the user enters into the CopyRightNow system and makes a CopyRightNow option choice 140 from three available options. The first option is the protect-only option, which is described in the A-branch 150 of the initial flowchart 100 and allows for a blog post to be protected by registering the blog post with the CopyRightNow system and/or submitting a copyright registration application to the United States Copyright Office without publishing the blog post. The second option is the publish-only option 160 in which the blog post is published through the blog-publishing application without the involvement of the CopyRightNow system. The third option is the protect-and-publish option, which is described in the B-branch 170 of the flowchart 100 and allows for a blog post to be protected by registering the blog post with the CopyRightNow system and/or by submitting a copyright registration application to the United States Copyright Office and then automatically publishes the blog post once the submission of the of the copyright registration application is confirmed.

In further detail, referring now to FIG. 2, the protect-only flowchart 200 is shown. The protect-only flowchart 200 is a continuation of the process flow of the initial flowchart 100 of FIG. 1 and illustrates the protect-only option of A-branch 150. In FIG. 2, starting with the A-branch continuation circle 250, the protect-only flowchart 200 describes the process flow for the protect-only option, which allows for the user to seek copyright protection of a blog post using the CopyRightNow Blog Post Protection Pathway API without publishing the blog post. The first protect-only step 210 of the protect-only flowchart 200 is when a user chooses to protect a blog post using the CopyRightNow Blog Post Protection Pathway API. Any changes that are made to the blog post after seeking protection through the CopyRightNow Blog Post Protection Pathway API will not be reflected in the CopyRightNow system or at the United States Copyright Office. Next, the user must make a CopyRightNow protect-only pathway choice 215 in which the user chooses between the CopyRightNow protect-only Copyright Office registration pathway 220 and the CopyRightNow protect-only registration pathway 270. In the CopyRightNow protect-only Copyright Office registration pathway 220, the user enters protect-only Copyright Office registration information 225. Next, the user agrees to the protect-only Copyright Office terms and service agreement 230. Next, the user verifies protect-only Copyright Office registration information and price and enters the user's CopyRightNow password 235. The CopyRightNow profile is linked to a user's CopyRightNow account and stores user information associated with the user, which is submitted with any copyright application or registration of a blog post. The CopyRightNow Blog Post Protection Pathway API assembles a final United States Copyright Office digital submission 240 and payment is processed through a third-party merchant system 265. Once the payment is processed, the user can manage the submitted content through the CopyRightNow system. The CopyRightNow Blog Post Protection Pathway API then electronically constructs a United States Copyright Office electronic registration application and automatically submits the application to the United States Copyright Office 245 and pays the requisite fees to the United States Copyright Office. The CopyRightNow Blog Post Protection Pathway API then receives electronic confirmation of the submission from the United States Copyright Office and provides the user with verification of the submission 255. In the CopyRightNow protect-only registration pathway 270, the user enters protect-only CopyRightNow registration information 275. Next, the user agrees to the protect-only CopyRightNow terms and service agreement 280. Next, the user verifies protect-only CopyRightNow registration information and price and enters the user's CopyRightNow password 285. The CopyRightNow profile is linked to a user's CopyRightNow account and stores user information associated with the user, which is submitted with any copyright application or registration of a blog post. Next, the CopyRightNow Blog Post Protection Pathway API assembles a final CopyRightNow digital submission 290. The user can then manage the submitted content through the CopyRightNow dashboard 295.

In further detail, referring now to FIG. 3, the protect-and-publish flowchart 300 is shown. The protect-and-publish flowchart 300 is a continuation of the process flow of the initial flowchart 100 of FIG. 1 and illustrates the protect-and-publish option of B-branch 170. In FIG. 3, starting with the B-branch continuation circle 350, the protect-and-publish flowchart 300 describes the process flow for the protect-andpublish option, which allows for the user to seek copyright protection of a blog post using the CopyRightNow Blog Post Protection Pathway API and to automatically publish the blog post after receiving confirmation of copyright protection. The first protect-and-publish step 310 of the protect-and-publish flowchart 300 is when a user chooses to protect and publish a blog post using the CopyRightNow Blog Post Protection Pathway API. Next, the user must make a CopyRightNow protect-and-publish pathway choice 315 in which the user chooses between the CopyRightNow protect-and-publish Copyright Office registration pathway 320 and the CopyRightNow protect-and-publish registration pathway 370. In the CopyRightNow protect-and-publish Copyright Office registration pathway 320, the user enters protect-and-publish Copyright Office registration information 325. Next, the user agrees to the protect-and-publish Copyright Office terms and service agreement 330. Next, the user verifies protect-and-publish Copyright Office registration information and price and enters the user's CopyRightNow password 335. The CopyRightNow profile is linked to a user's CopyRightNow account and stores user information associated with the user, which is submitted with any copyright application or registration of a blog post. The CopyRightNow Blog Post Protection Pathway API assembles a protect-and-publish final United States Copyright Office digital submission 340 and the protect-and-publish payment is processed through a third-party merchant system 365. Once the protect-and-publish payment is processed, the user can manage the submitted content through the CopyRightNow dashboard 360. The CopyRightNow Blog Post Protection Pathway API then electronically constructs a protect-and-publish United States Copyright Office electronic registration application and automatically submits the application to the United States Copyright Office 342 paying the requisite fees to the United States Copyright Office. The CopyRightNow Blog Post Protection Pathway API then receives electronic confirmation of the submission from the United States Copyright Office, provides the user with verification of the protect-and-publish submission 345 and automatically publishes the protected blog post 355 to the blog-publishing application unless the user opts out of the automatic publication. In the CopyRightNow protect-and-publish registration pathway 370, the user enters protect-and-publish CopyRightNow registration information 375. Next, the user agrees to the protect-and-publish CopyRightNow terms and service agreement 380. Next, the user verifies protect-and-publish CopyRightNow registration information and price and enters the user's CopyRightNow password 385. The CopyRightNow profile is linked to a user's CopyRightNow account and stores user information associated with the user, which is submitted with any copyright application or registration of a blog post. Next, the CopyRightNow Blog Post Protection Pathway API assembles a protect-and-publish final CopyRightNow digital submission 390. The user can then manage the submitted protect-and-publish content through the CopyRightNow dashboard 392. The protect-and-publish CopyRightNow Blog Post Protection Pathway API then automatically publishes the protected blog post 395 to the blog-publishing application unless the user opted out of the automatic publication.

In further detail, referring now to FIG. 4, screen views of blog-publishing applications are shown. In FIG. 4, the login screen of the blog-publishing application, Tumblr 401, is illustrated. Also in FIG. 4., the login screen of the blog-publishing application, Wordpress 402, is displayed. Additionally in FIG. 4, the login screen of the blog-publishing application, Blogger 403, is shown. Moreover, in FIG. 4 the login screen of the blog-publishing application, Weebly 404, is depicted.

In further detail, referring now to the invention of FIG. 5, FIG. 6, FIG. 7, FIG. 8, FIG. 9, FIG. 10 and FIG. 11, a screen view of a blog-publishing application 405, which is Tumblr, with integrated CopyRightNow functionality, is shown. FIG. 5 depicts a home screen 413 of a blog-publishing application 405 with blog posts 406. The CopyRightNow blog post button 409 appears within the action menu 408 of a blog post 406. The user may initiate the creation of various types of blog posts 406; including text posts, photo posts, quote posts, link posts, chat posts, audio posts, video posts or the like; by selecting a blog creation button from the blog post creation menu 407. When the user selects a blog creation button, such as the photo blog post creation button 455 in FIG. 5, a blog post creation window 412 with integrated CopyRightNow functionality, which is shown in FIG. 6, is displayed within the blog-publishing application 405. In FIG. 6, a photo blog post 411 is shown in the process of being created within the blog post creation window 412. The photo blog post 411 may be published without CopyRightNow protection by selection the publish button 457. The CopyRightNow blog path selection button 410 is shown within the blog post creation window 412. When the user selects the CopyRightNow blog path selection button 410 of FIG. 6, the blog path selection window 415, which is shown in FIG. 7, is displayed within the blog-publishing application 405. In the CopyRightNow blog path selection window 415, the user is presented with two options, the CopyRightNow protect-only pathway 417 and the CopyRightNow protect-and-publish pathway 419. When the user selects the CopyRightNow protect-only 417, the steps of the CopyRightNow protect-and-publish pathway 419 are performed without automatic publication once copyright protection is confirmed. When the user selects the CopyRightNow protect-and-publish pathway 419 of FIG. 7, the CopyRightNow protect-and-publish registration information window 420, which is shown in FIG. 8, is displayed within the blog-publishing application 405. The CopyRightNow protect-and-publish registration information window 420 allows the user to enter information pertinent to copyright protection. The title of the blog post is entered into the CopyRightNow blog post title field 421. A description of the blog post is entered into the CopyRightNow blog post description field 422. The year of completion of the blog post is entered into the CopyRightNow blog post year field 414. The CopyRightNow protect-and-publish registration information window 420 also allows the user to enter the author of the blog post into the CopyRightNow blog post author field 423, the email address of the author of the blog post into the CopyRightNow blog post email field 427, the address of the author of the blog post into the CopyRightNow blog post address field 426, the city of the author of the blog post into the CopyRightNow blog post city field 425, the country of the author of the blog post into the CopyRightNow blog post country field 424, or import this information from the user's CopyRightNow profile. The user may return to the previous window by selecting the CopyRightNow protect-and-publish registration information window back button 428. The user may move on to the next step in the process by selecting the CopyRightNow protect-and-publish registration information window next button 429. When the user selects the CopyRightNow protect-and-publish registration information window next button 429 of FIG. 8, the CopyRightNow terms and service agreement window 430 of FIG. 9 is displayed within the blog-publishing application 405. The CopyRightNow terms and service agreement window 430 displays the certification list 431, to which the user may agree by selecting the certification agreement checkbox 432. The user may also browse the CopyRightNow terms and conditions by selecting the CopyRightNow terms and conditions link 436. The user may agree to the CopyRightNow terms and conditions by selecting the CopyRightNow terms and conditions agreement checkbox 433. The user may return to the previous window by selecting the CopyRightNow terms and service agreement window back button 434. The user may move on to the next step in the process by selecting the CopyRightNow terms and service agreement window next button 435. When the user selects the CopyRightNow terms and service agreement window next button 435 of FIG. 9, the CopyRightNow blog post registration payment window 440 of FIG. 10 is displayed within the blog-publishing application 405. The CopyRightNow blog post registration payment window 440 allows the user to review and verify information, which was entered earlier by the user or retrieved from the user's profile, by displaying that information within a CopyRightNow blog post registration information field 441. If the information is correct and if the user agrees to the blog post registration payment amount 443, the user enters his/her CopyRightNow password into the CopyRightNow password field 446. The user may return to the previous window by selecting the CopyRightNow blog post registration payment window back button 444. Selecting the CopyRightNow blog post registration submission button 445 instructs the CopyRightNow Blog Post Protection Pathway API to assemble an electronic copyright application for the blog post using the supplied information and to automatically submit the copyright application to the United States Copyright office along with the appropriate registration fees. When the CopyRightNow Blog Post Protection Pathway API receives electronic confirmation of the submission of the copyright registration application and fees, the CopyRightNow Blog Post Protection Pathway automatically publishes the protected blog post to the blog-publishing application 405, and the CopyRightNow blog post submission confirmation window 450 of FIG. 11 is displayed within the blog-publishing application 405. The information relevant to copyright protection may also be registered and recorded with the CopyRightNow system. Selecting the CopyRightNow blog post submission confirmation window OK button 451 returns the user to the home screen 413 of the blog-publishing application 405 illustrated in FIG. 5.

The construction details of the invention as shown in FIG. 1, FIG. 2, FIG. 3, FIG. 4, FIG. 5, FIG. 6, FIG. 7, FIG. 8, FIG. 9, FIG. 10 and FIG. 11, are that the improved method and system for providing copyright protection for a blog post from within a third party blog-publishing application comprises a CopyRightNow Blog Post Protection Pathway API, which is software that is incorporated into a third party blog-publishing application, and which runs from within the third party blog-publishing application without exiting the blog-publishing application. The CopyRightNow Blog Post Protection Pathway API interacts with the CopyRightNow system and exchanges information with the CopyRightNow system. The CopyRightNow system comprises one or more web servers with one or more databases of user data, software to assemble copyright applications, software to process payments, software to interact with the United States Copyright Office, and software to run the CopyRightNow application. After a user has created a blog post within a blog-publishing application but before the blog post is published, the user may seek copyright protection by activating the CopyRightNow Blog Post Protection Pathway API from within the blog-publishing application and without exiting the blog-publishing application. User information stored within the CopyRightNow system's user database may be downloaded for use by the CopyRightNow Blog Post Protection Pathway API, or the user may manually enter this information. Before publishing the blog post, the user may choose to register the work with the CopyRightNow system or pursue copyright registration with the United States Copyright Office. When the user selects CopyRightNow registration, the CopyRightNow Blog Post Protection Pathway API gathers any additional necessary information that is not available in the CopyRightNow database through user entry, collects payment and uploads the blog post to the CopyRightNow system along with information relevant to copyright protection. The user may later access the uploaded content through the CopyRightNow application. When the user selects copyright registration with the United States Copyright Office, the CopyRightNow Blog Post Protection Pathway API gathers any additional necessary information that is not available in the CopyRightNow database through user entry, collects payment and uploads the blog post to the CopyRightNow system along with information relevant to copyright protection. The CopyRightNow system utilizes software to generate an electronic copyright application and then electronically submits the generated copyright application to the United States Copyright office along with the appropriate application and registration fees. The CopyRightNow system receives electronic confirmation of the submission of the generated copyright application from the United States Copyright Office and then relays the confirmation to the CopyRightNow Blog Post Protection Pathway API, which is running on the blog-publishing application, and then automatically publishes the blog post through the blog-publishing application. The user may later access the submitted content through the CopyRightNow system or the CopyRightNow application. The CopyRightNow Blog Post Protection Pathway API provides a portable interface for obtaining copyright protection for a blog post from within a blog-publishing application before the blog post is published and then automatically publishing the blog post through the blog-publishing application once copyright protection of the blog post is confirmed.

The advantages of the present invention include, without limitation, that it provides an improved method and system for providing copyright protection before publishing a blog post from within a running blog-publishing application and without requiring the blog-publishing application to be closed, which may result in the loss of the blog post. Additionally, the present invention promotes the registration of copyrights by providing a quick and easy means of registering a copyright on a blog post before publishing the blog post. Furthermore, the present invention has the advantage of collecting information relevant to the successful enforcement of copyright protection. Moreover, the present invention allows blog post creators to protect their original works from the blog publishing application in which the blog post was created, allowing blog posts to be readily protected before publication.

In broad embodiment, the present invention relates generally to an improved method and system for providing copyright protection for blog posts prior to publication from within a running blog-publishing application by automatically assembling and submitting an electronic copyright application for the blog post to the United States Copyright Office and then automatically publishing the blog post through the blog-publishing application once submission of the electronic copyright application for the blog post is confirmed. More particularly, the present invention relates generally to a method and system for providing copyright protection for blog posts prior to publication from within a running blog-publishing application by automatically assembling and electronically submitting a copyright application for the blog post to the United States Copyright Office through the use of a portable application programming interface, which may be utilized by third-party blog-publishing applications, and then automatically publishing the blog post through the blog-publishing application once submission of the electronic copyright application for the blog post is confirmed. Additionally, the present invention relates generally to a method and system of registering a blog post prior to publication in order to memorialize the creation of the blog post from within a running blog-publishing application through the use of a portable application programming interface, which may be utilized by third-party blog-publishing applications, and then automatically publishing the blog post through the blog-publishing application once registration of the blog post is confirmed.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiments, methods, and examples, but by all embodiments and methods that are within the scope and spirit of the invention as claimed.

What is claimed is:

1. A method for operating a host computing device to obtain copyright protection for a blog post within a blog-publishing application, the method comprising:
    capturing a user inputted blog post by a blog-publishing application running on the host computing device;
    based upon user input received via the blog-publishing application running on the host computing device and from within the blog-publishing application, launching a copyright registration application running on the host computing device via an Application Program Interface (API) of the blog-publishing application running on the host computing device and an API of the copyright registration application running on the host computing device, wherein the API of the copyright registration application supports presentation of an icon within a user interface of the blog-publishing application, and wherein selection of the icon supports launching the copyright registration application; and
    the copyright registration application running on the host computing device:
    receiving the blog post from the blog-publishing application via the API of the blog-publishing application and the API of the copyright registration application;
    obtaining copyright registration information for the blog post based upon at least one of user input and stored data;
    accessing a remote copyright registration data web server via the Internet;
    retrieving recorded user information for a user from the remote copyright registration data web server;
    uploading the blog post to the remote copyright registration data web server;
    receiving payment information via user input;
    interfacing with the remote copyright registration data web server to generate an electronic copyright application using the copyright registration information, the recorded user information, the payment information, and the blog post;
    interfacing with the remote copyright registration data web server to electronically submit the electronic copyright application to a copyright registration server; and
    receiving a confirmation of submission of the copyright registration application;
    automatically publishing the blog post by the blog-publishing application after the confirmation is received; and
    the copyright registration application running on the host computing device presenting an option to upload the blog post to the remote copyright registration data web server without applying for copyright registration.

2. The method of claim 1, wherein the blog-publishing application captures one or more of video recordings, photographs, audio recordings, text data, or graphics data.

3. The method of claim 1, wherein launching the copyright registration application running on the host computing device is performed without exiting the blog-publishing application.

4. The method of claim 1, the user input received via the blog-publishing application to cause launching of the copyright registration application comprises user selection of an icon representing the copyright registration application that is presented via a user interface of the blog-publishing application.

5. The method of claim 1, further comprising the copyright registration application uploading the blog post to the remote copyright registration data web server for subsequent access by the copyright registration application running on the host computing device.

6. The method of claim 1, further comprising the blog-publishing application presenting a selectable icon to access the copyright registration application and at least one selectable icon to access at least one corresponding content sharing application.

7. The method of claim 1, wherein the host computing device is a mobile computing device.

8. The method according to claim 1 wherein the blog-publishing application is a third party blog-publishing application.

9. A system comprising:
    memory;
    at least one processor;
    an instruction storage module storing instructions that when executed by the at least one processor, cause the at least one processor to:
    capture a user inputted blog post by a blog-publishing application;
    based upon user input received via the blog-publishing application and from within the blog-publishing application, launch a copyright registration application via an Application Program Interface (API) of the blog-publishing application and an API of the copyright registration application, wherein the API of the copyright registration application supports presentation of an icon within a user interface of the blog-publishing application, and wherein selection of the icon supports launching the copyright registration application; and
    via the copyright registration application:
    receive the blog post from the blog-publishing application via the API of the blog-publishing application and the API of the copyright registration application;
    obtain copyright registration information for the blog post based upon at least one of user input and stored data;
    access a remote copyright registration data web server via the Internet;
    retrieve recorded user information for a user from the remote copyright registration data web server;
    upload the blog post to the remote copyright registration data web server;
    receive payment information via user input;

interface with the remote copyright registration data web server to generate an electronic copyright application using the copyright registration information, the recorded user information, the payment information, and the blog post;

interface with the remote copyright registration data web server to electronically submit the electronic copyright application to a copyright registration server; and receive a confirmation of submission of the copyright registration application;

automatically publish the blog post by the blog-publishing application after the confirmation is received; and the copyright registration application presents an option to upload the blog post to the remote copyright registration data web server without applying for copyright registration.

10. The system of claim 9, wherein the blog-publishing application captures one or more of video recordings, photographs, audio recordings, text data, or graphics data.

11. The system of claim 9, wherein launching the copyright registration application is performed without exiting the blog-publishing application.

12. The system of claim 9, the user input received via the blog-publishing application to cause launching of the copyright registration application comprises user selection of an icon representing the copyright registration application that is presented via a user interface of the blog-publishing application.

13. The system of claim 9, wherein the copyright registration application uploads the blog post to the remote copyright registration data web server for subsequent access by the copyright registration application.

14. The system of claim 9, wherein the blog-publishing application presents a selectable icon to access the copyright registration application and at least one selectable icon to access at least one corresponding content sharing application.

15. The system of claim 9, wherein the system is a mobile computing device.

16. The system according to claim 9, wherein the blog-publishing application is a third party blog-publishing application.

17. The system of claim 9, wherein the memory and the instruction storage module comprise a single memory structure.

* * * * *